A. F. SAUNDERS.
TEAPOT.
APPLICATION FILED APR. 16, 1921.

1,420,758.

Patented June 27, 1922.

Albert F. Saunders, INVENTOR.

BY

Parsons & Bodell, ATTORNEYS.

UNITED STATES PATENT OFFICE.

ALBERT F. SAUNDERS, OF EAST SYRACUSE, NEW YORK, ASSIGNOR TO T. N. BENEDICT MFG. CO., OF EAST SYRACUSE, NEW YORK, A CORPORATION OF NEW YORK.

TEAPOT.

1,420,758. Specification of Letters Patent. Patented June 27, 1922.

Application filed April 16, 1921. Serial No. 461,831.

*To all whom it may concern:*

Be it known that I, ALBERT F. SAUNDERS, a citizen of the United States, and a resident of East Syracuse, in the county of Onondaga and State of New York, have invented a certain new and useful Teapot, of which the following is a specification.

This invention has for its object the production of tea pots and the like which are particularly simple and economical of manufacture, neat in appearance and highly efficient and durable in use.

The invention consists in the combinations and constructions hereinafter set forth and claimed.

In describing this invention, reference is had to the accompanying drawings in which like characters designate corresponding parts in all the views.

Figure 1:
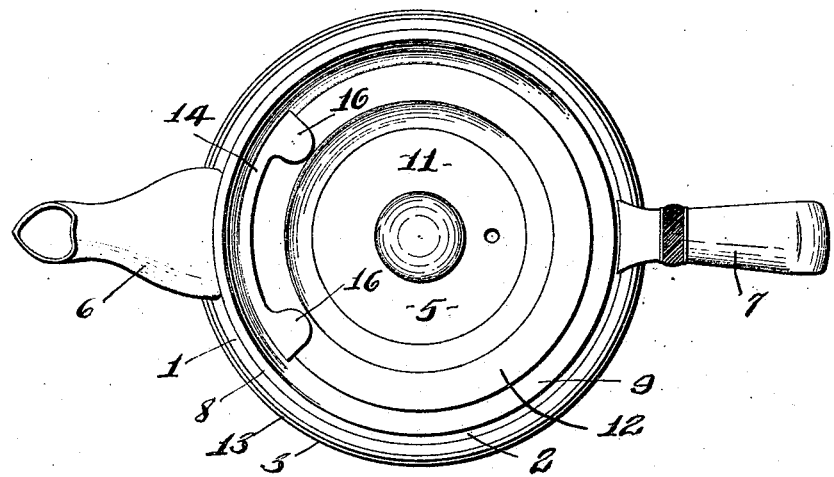
Figure 1 is a plan view of this tea pot.
Figure 2:
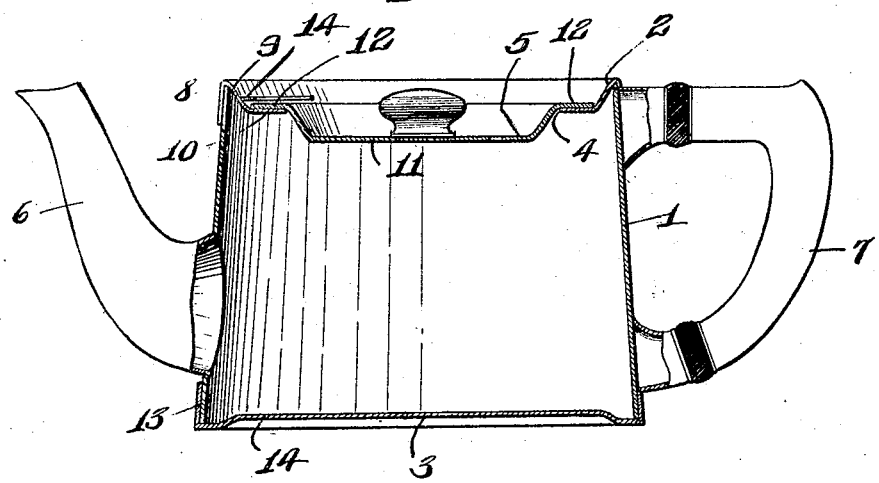
Figure 2 is a central vertical sectional view, partly in elevation.

This tea pot comprises generally, a tubular wall 1 and top and bottom walls 2, 3, the top wall being formed with an opening 4, a lid 5 seated in the opening, the top wall being provided with means coacting with the lid to prevent displacement of the lid when the pot is tipped.

As here illustrated, the body 1 tapers slightly toward its upper end, that is, it is frusto-conical in form, and is provided with the usual spout 6 and handle 7 located diametrically opposite each other. The top wall 2 is formed with an annular flange 8 which overlaps the margin of the side wall 1 and the depressed portion includes a downwardly inclined or depending annular part 9 and an inwardly extending horizontal flange 10 at the lower edge of the inclined part 9, the flange encircling the opening 4 in the top wall 2. The lid 5 has a central part 11 depressed through the opening 4 and has its margin 12 resting on the flange 10.

The bottom wall 3 is provided with an annular flange 13 similar to the flange 8 or the top 2, and the bottom has its intermediate portion 14 depressed into the space enclosed by the wall 1.

The means for holding the lid 15 from displacement when the pot is tipped to pour out the contents thereof through the spout 6, comprises an arc-shaped strip 14 fixed to the inclined or depending part 9 of the top and projecting horizontally over the flange 10, this arc-shaped strip terminating at its ends in inwardly projecting lugs 16 overlying the portion of the marginal flange 12 of the lid.

This strip 14 is located on the side of the top wall nearest the spout 5 and extends equidistantly on opposite sides of the spout.

The strip may be secured to the incline part 9 of the top wall in any suitable manner as by soldering or welding.

Owing to the construction of the top and bottom wall, these pots are particularly economical in manufacture and attractive in appearance.

Furthermore, the annular flanges 8 and 13 give an attractive ornamental effect to the pot.

What I claim is:

1. A tea pot comprising a body including a tubular side wall and top and bottom walls, the top wall being formed with a circular opening and including an annular depending part, and a horizontal flange projecting from the depending part, a lid having a central depression extending through the opening in the top and its marginal portion lapping said flange, and a pair of lugs projecting from the depending part of the top and overhanging the flange for engaging the margin of the lid and preventing displacement of the lid when the pot is tipped, substantially as and for the purpose described.

2. A tea pot comprising a body including a tubular side wall, and top and bottom walls, the top wall being formed with a circular opening and including an annular depending part, a horizontal flange projecting from the depending part, a lid having a central depression extending through the opening in the top of its marginal portion lapping said flange, and an arc-shaped strip projecting from the depending part of the top and overhanging a portion of such flange and being spaced apart therefrom, and a portion of the margin of the cover extending under such strip, the strip preventing displacement of the lid when the pot is tipped, substantially as and for the purpose specified.

3. A tea pot comprising a body including a tubular side wall and top and bottom walls, each of the top and bottom walls having an annular marginal flange overlapping the contiguous portion of the side wall, and a portion depressed into the space enclosed by the side wall, the top wall having a circular opening in its depressed portion and also having an arc-shaped margin of the top wall around such opening, a lid having its margin resting on the margin of the top wall around such opening, and a portion of such margin extending under the arc-shaped strip; said strip preventing displacement of the lid when the pot is tipped, substantially as and for the purpose described.

In testimony whereof, I have hereunto signed my name, at E. Syracuse, in the county of Onondaga, and State of New York, this 29th day of March, 1921.

ALBERT F. SAUNDERS.